Nov. 22, 1966  P. W. KLOOZ ET AL  3,286,754
SELF-LOCKING SET SCREW
Filed Sept. 11, 1964

INVENTORS
PAUL W. KLOOZ
HERMAN G. MUENCHINGER
BY
Morgan, Finnegan, Durham & Pine
ATTORNEYS

United States Patent Office 3,286,754
Patented Nov. 22, 1966

1

3,286,754
SELF-LOCKING SET SCREW
Paul W. Klooz, West Hartford, and Herman G. Muenchinger, Chaplin, Conn., assignors to Veeder-Root, Incorporated, Hartford, Conn., a corporation of Connecticut
Filed Sept. 11, 1964, Ser. No. 395,727
4 Claims. (Cl. 151—37)

This invention relates to improvements in self-locking set screws of the type wherein the self-locking function is achieved by forming a plurality of ribbed projections or knurls at one end of the screw which are adapted to engage a workpiece. More particularly, this invention relates to an improved self-locking set screw of the type having the interlocking projections or knurls formed on the surface of a countersunk recess in the point or work-engaging extremity of the screw.

Self-locking screws have been known in the past wherein knurls are formed on an internal surface at the screw point. In these prior screws, however, several disadvantageous structural features are present, such as, inter alia, the countersunk recess formed in the tip of the screw has a conical taper; the direction of the swirl of the knurled teeth is opposite to the direction of rotation of the screw when the screw is being tightened; and an even number of the knurl teeth are formed on the countersunk surface. In other forms of prior self-locking screws the knurls have been radial so that a relatively small portion of the volume between the teeth was filled with the parent material, thus reducing the ability of the screw to resist loosening.

These structural features of prior art self-locking screws are disadvantageous for the several reasons discussed hereinafter. The conical taper has a relatively small volume for containing metal chips dislodged during the tightening operation. In addition, where the direction of the swirl radius of the knurled teeth is opposite to the direction of the thread of the screw, the teeth do not dig into the workpiece to prevent loosening of the screw. Where there are an even number of knurl teeth on the screw point, the rotational forces working to loosen the screw eventually act against a point where there is no resistance to movement; hence, the upset material of the workpiece is more susceptible to a reaming action resulting in easy loosening of the screw.

In accordance with the present invention the foregoing disadvantages of prior self-locking screws are overcome by providing a self-locking screw which as a result of the turning action in applying the screw will automatically engage the workpiece with increased resistance upon application of force tending to remove the self-locking screw from the workpiece.

Self-locking screws in accordance with this invention are constructed and arranged with spiral knurls or teeth on a curvilinear surface on an internal recess at the work engaging end of the screw which dig into the surface of the workpiece to prevent disengagement while providing sufficient volume for any chips that may be dislodged from the workpiece.

In view of the foregoing it is an object of this invention to provide a new and improved self-locking set screw.

Another object of this invention is to provide a new and improved self-locking set screw having increased holding power against loosening after it has been applied to the workpiece.

Another object of this invention is to provide a new and improved self-locking set screw having spiralled knurls or teeth on an internal recess wherein the recess is shaped to provide for increased tooth engagement with the workpiece.

2

A further object of the invention is to provide a new and improved self-locking set screw with spirally directed knurls or teeth having a semi-buttress shape which displaces the material of the workpiece without shearing the material to hereby prevent loosening of the screw.

A further object of the invention is to provide a new and improved self-locking set screw having internal knurls formed with a radial swirl wherein the direction of the swirl is the same as the direction of the thread on the set screw.

A further object of the invention is to provide a new and improved self-locking set screw having internal knurls wherein the knurls are formed in a substantially triangular shape having a small leading angle and a large locking angle.

A still further object of this invention is to provide a new and improved self-locking set screw having an odd number of teeth adapted to engage the workpiece.

Still another object of this invention is to provide a new and improved self-locking screw having a plurality of work engaging teeth on an internal surface wherein there is a predetermined relation between the external threads and internal teeth.

Objects and advantages of the invention are set forth in part herein and in part will be obvious herefrom, or may be learned by practice with the invention, the same being realized and attained by means of the instrumentalities and combinations pointed out in the appended claims.

Briefly described, the present invention comprises a self-locking screw of the type having outer threads thereon in which a countersunk recess is formed at the end or work-engaging extremity thereof. The countersunk recess preferably has a generally curvilinear contour, the surface of which is radially knurled to form an odd number of ribbed projections or teeth thereon. Each of the radial teeth has a radial swirl or is spiralled in the clockwise, or leading, direction of the screw and is characterized by a generally triangular shape, having a shallow leading angle and a relatively steep locking angle.

The invention consists in the novel parts, constructions, arrangements, combinations and improvements herein shown and described.

It will be understood that the foregoing general description and the following detailed description as well are exemplary and explanatory of the invention but are not restrictive thereof.

The accompanying drawings, referred to herein and constituting a part hereof, illustrate one embodiment of the invention, and together with the description, serve to explain the principles of the invention.

Figure 1:
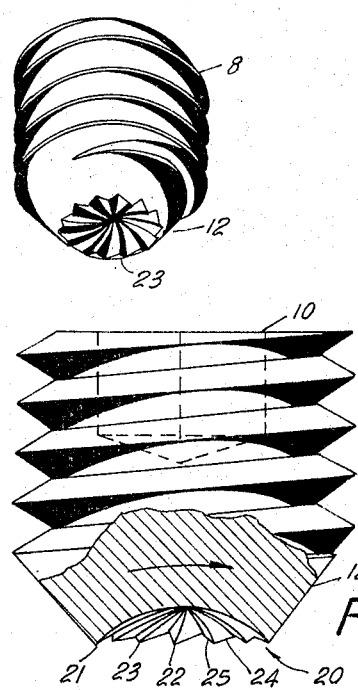
FIGURE 1 is a perspective view of a self-locking set screw embodying the invention.
Figure 2:
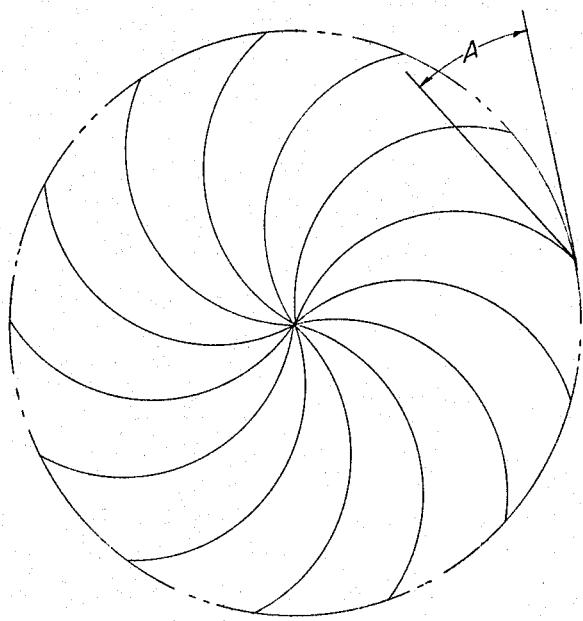
FIGURE 2 is an enlarged schematic bottom view of the set screw illustrated in FIGURE 1.
Figure 3:
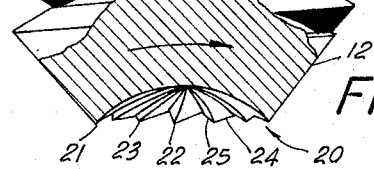
FIGURE 3 is a side elevational and partial sectional view of the set screw illustrated in FIGURE 1.

Referring now more particularly to the embodiment of the invention shown in the drawings, there is illustrated in FIGURES 1 to 3 a conventional hollow set screw having outer threads 8 comprising at one end a wrench-receiving socket 10, indicated by broken lines, and at the other end a point or work-engaging tip 12 of generally frusto conical external form. The extremity of the point 12 is formed with a countersunk recess 20 of a generally curvilinear contour, the extremity 21 of which is concentric with the longitudinal axis of the screw.

Figure 5:
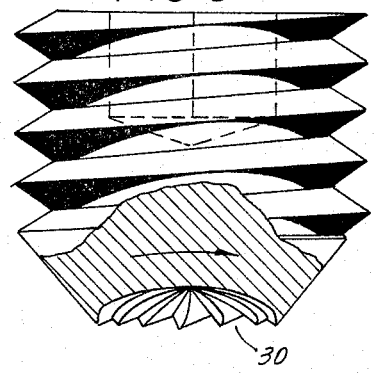
FIGURE 5 is a side elevational and partial sectional view of a self-locking set screw embodying a modified version of my invention.

The effectiveness of the locking action of the screw is in part determined by the volume capacity of recess 20 for the upset material of the workpiece which is entrapped therein. This capacity is governed by the depth of the recess and may be maximized by the geometrical contour of the recess. It has been found that a recess having a depth of about 40 percent of the thread lead and of a generally spherical contour, as illustrated in FIGURE 3, gives satisfactory results. Alternatively, the recess may be semi-elliptical in shape, as illustrated at 30 in FIGURE 5, by varying the swirl radius of the knurled teeth 22, more fully described hereinbelow. The curvilinear shape of the recess permits a relatively large volume for retaining the upset material of the workpiece and any chips of material which may be dislodged during seating and tightening of the screw.

In accordance with the invention, the countersunk recess 20 is provided with a plurality of ribbed projections or teeth 22 formed by forging, although it will be understood that the projections may be formed by suitable means other than by forging. Teeth 22 are spiralled and, accordingly, have a radial swirl from the center of the workpiece in the leading direction of the set screw, that is, the direction towards which the screw is turned in order to tighten the screw, which is conventionally the clockwise direction, as best illustrated in FIGURE 2, and which will be utilized for the purposes of describing the invention.

Figure 7:
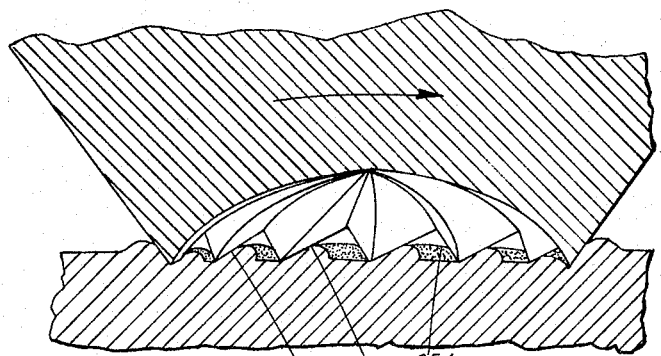
FIGURE 7 is a sectional view of a self-locking screw in accordance with this invention in work-engaging position.

One advantage of a general spiral pattern for the teeth is that the spiral pattern deflects the material radially outwardly through a reduced distance and helps fill the full tooth space, see FIG. 7, rather than a small portion of it. The angle A that the spiral makes with the cup circle should be less than 90° in order to accomplish the required radial deflection of the workpiece material. This relationship is best seen in FIGURE 2.

Figure 6:
FIGURE 6 is a development view of the tooth profile of the knurls formed on the self-locking set screw in accordance with the invention.

The teeth are formed into a generally triangular shape, each having an apex 23 terminating at 21 to form the edge of recess 20; a leading side 24 having a shallow leading angle, and a trailing or locking side 25 having a relatively steep locking angle. Referring more specifically to FIGURE 6 in one preferred embodiment of the invention, the locking angle is about 60°, whereas the leading angle is about 22°. However, the invention is not limited to these specific values for the locking and leading angle, although, in accordance with this invention the locking angle will be substantially greater than the leading angle.

In accordance with this invention there is a preferred relationship between the spacing and depth of the spiral teeth in relation to the external thread. In a preferred embodiment the relation is preferable such that when the screw is turned in a tapped hole through the arc subtended by any two adjacent teeth the axial movement of the screw will not exceed 10% of the tooth depth.

Figure 4:
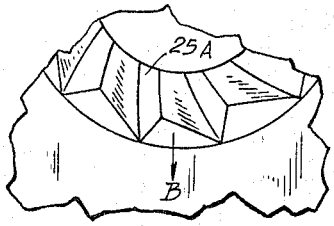
FIGURE 4 is a partial top plan view of a workpiece in which the set screw of FIGURE 1 has been embedded.

The spiral form of the teeth 22 and the clockwise or leading direction of the radial swirl combine to facilitate and control the flow of the upset material of the workpiece during seating of the screw to provide greatly improved holding power and reliable locking action. The clockwise swirl of the teeth tends to deflect and flow the upset material radially outwardly (see arrow B in FIGURE 4), thus preserving rather than breaking off the upset material in the mirrored form of knurled teeth 22. The upset material becomes entrapped between the teeth and, while the shallow angle of the leading side 24 permits continued clockwise rotation of the screw, the steep angle of the side 25a (FIG. 4) of the entrapped material strongly resists counterclockwise loosening of the screw.

In accordance with the invention, a predetermined odd number of teeth 22 are formed on the surface of the countersunk recess 20. Thus, the counterclockwise rotational forces working to loosen the screw are resisted by entrapped material between each tooth, and there is no point at which this resistance ceases to exist, as will occur when an even number of teeth are used. While thirteen teeth are illustrated in the present drawings, it will be understood that this is a representative number only, and that the actual odd number of teeth used will vary according to specific circumstances.

The operation of a set screw in accordance with this invention can be best understood with reference to the following description relating to a specific embodiment of the invention.

With a set screw having a recess of a depth of approximately 40% of the thread lead, with 13 teeth formed thereon in accordance with the invention, the operation of the self-locking knurls during seating and tightening of the screw is as follows:

On initial contact with the work material with which the set screw is to be interlocked, the apexes of the knurled teeth forming the edge of the countersunk recess perform a trepanning action until a circular groove about 15% of the depth of the recess is produced. During this time the upset material of the workpiece is being trapped within the teeth and, due to the direction of the teeth, deflected radially outwardly. With the depth of the recess less than ½ of the lead of the screw thread, the recess is usually no more than about ½ the lead of the screw thread, full and actual tightening of the screw could be accomplished in approximately 90° of rotation. Allowing for the initial trepanning action, the tightening operation with entrapped metal is accomplished in approximately 45° of rotation.

The clockwise direction of the swirl radius of the teeth promotes the radial flow of entrapped material, preserving the upset material in the mirrored form of the knurl teeth (see FIGURE 7), thereby providing strong resistance to counterclockwise loosening rotation of the screw. As shown in FIGURE 7, with the buttress form of tooth, mounds of entrapped material are shown at 35B with additional deflected material 35A which has been deflected outwardly from the spiral cavity. This resistance becomes apparent from the following analysis. With 13 teeth formed on the recess, the spacing from tooth to tooth is approximately 30°. However, 30° of rotation of even a relatively coarse pitch screw, for example, with lead of $\frac{1}{16}$ of an inch results in approximately only .005 inch axial movement of the screw; since the teeth are normaly embedded in the work material to a depth greater than .005 inch, the entrapped material would have to be sheared in order to loosen the screw.

It will be understood to those skilled in the art that the dimensions and contour of the countersunk recess and the knurled teeth will depend on particular conditions, such as, for example, the size of the set screw, the depth and hardness of the work material, etc. It has been found, however, that the good results are achieved if the dimensions are maintained within the following parameters. Using the major diameter of the screw as a reference dimension, countersunk recess 20 should have a diameter at the extremity 21 thereof approximately ½ the major diameter; a radius of from ½ to ¼ the major diameter a depth of ¼ to $\frac{1}{12}$ of the major diameter (or approximately 20 to 40% of the thread lead) and a swirl radius from about ⅓ to ¼ the major diameter.

The above described relationship between the major diameter of the screw, the diameter of the cup-shaped recess, the radius of the recess and the depth of the cup-shaped recess result in a self-locking screw having maximum space for chips accumulated during tightening of the screw without weakening the cutting edge of the self-locking set screw. Such weakening can occur, for example, where a conical shaped recess is utilized and it is made large enough to accommodate the accumulated chips. In general, however, if the depth of the cup is too small, then there is insufficient volume in the recess to accommodate the chips. On the other hand, if the diameter of the recess is too large, then the cutting edge of the set screw may be broken when the set screw is in use. Similarly, the above described relationship of the swirl radius is important in providing a self-locking screw which is easily turned into the desired position but which engages the workpiece with increased gripping force effectively preventing the loosening of the set screw after having been turned into the workpiece.

The invention in its broader aspects is not limited to the specific embodiment herein shown and described but departures may be made therefrom within the scope of the accompanying claims, without departing from the principles of the invention and without sacrificing its chief advantages.

What is claimed is:

1. A self-locking screw having external threads on the outer surface adapted to be threaded into a hole and to engage a workpiece comprising: a work-engaging end having a countersunk recess of a generally curvilinear contour axially disposed therein; a plurality of teeth in spiral form etxending radially from the center of said set screw on the internal surface of said recess in the same direction as said external thread, said teeth being generally triangular in shape and having a shallow leading angle and a relatively steep locking angle and terminating at the edge of said recess concentric with the longitudinal axis of the screw so that the material of the workpiece is deflected and flowed radially outwardly upon engagement therewith by the point of said screw so that said teeth will engage the material to prevent loosening of said set screw, said teeth having a spacing and depth in relation to the external threads such that when the external threads are turned through an arc equal to the arc subtended by two adjacent teeth the axial movement of the screw will not exceed 10% of the tooth depth.

2. A set screw as defined in claim 1 wherein the radius of said teeth is ⅓ to ¼ of the diameter of said set screw.

3. A set screw as defined in claim 2 wherein the diameter of said recess is about ½ of the diameter of said set screw.

4. A device as defined in claim 3 wherein there are an odd number of said teeth.

References Cited by the Examiner

UNITED STATES PATENTS

| | | | |
|---|---|---|---|
| 2,128,758 | 8/1938 | Olson | 151—37 |
| 2,210,087 | 5/1940 | Hallowell | 151—70 |
| 2,210,455 | 8/1940 | Hosking | 151—37 |
| 2,235,435 | 3/1941 | Koester | 151—70 |
| 2,245,525 | 6/1941 | Dicely | 151—70 |
| 2,691,538 | 10/1954 | Clausen | 151—70 |
| 3,078,899 | 2/1963 | Mac Lean et al. | 151—37 |

CARL W. TOMLIN, *Primary Examiner.*

EDWARD C. ALLEN, *Examiner.*

M. PARSONS, JR., *Assistant Examiner.*

UNITED STATES PATENT OFFICE
CERTIFICATE OF CORRECTION

Patent No. 3,286,754                                 November 22, 1966

Paul W. Klooz et al.

It is hereby certified that error appears in the above numbered patent requiring correction and that the said Letters Patent should read as corrected below.

Column 6, line 20, for "2,128,758 8/1928" read -- 2,128,757 8/1938 --; line 21, for "2,210,087" read -- 2,201,087 --.

Signed and sealed this 12th day of September 1967.

(SEAL)
Attest:

ERNEST W. SWIDER                            EDWARD J. BRENNER
Attesting Officer                                Commissioner of Patents